3,300,435
PRINTING INK FOR VINYLIDENE CHLORIDE
COPOLYMER PRODUCTS
Kazuo Ueda, Nakoso, and Shiro Kawamukai, Higami Gun, Japan, assignors to Kureha Chemical Industry Co., Ltd., Tokyo, Japan, a corporation of Japan
No Drawing. Filed Apr. 20, 1964, Ser. No. 361,272
Claims priority, application Japan, Apr. 24, 1963, 38/21,457
5 Claims. (Cl. 260—30.4)

The present invention relates to a printing ink for vinylidene chloride copolymer products, and more particularly, to a printing ink capable of furnishing a printed surface having high adherence to films or film-like products made by melt-extruding a composition obtained by adding 6 to 10% by weight of a modifying agent and other materials to a polymer of vinylidene chloride and especially to a copolymer (hereinafter referred to as "polyvinylidene copolymer") consisting of 70 to 90% by weight of vinylidene chloride and 30 to 10% by weight of vinyl chloride.

The principal object of the present invention is to provide printing inks capable of providing prints having a high resistance to abrasion and non-peeling properties to films or film-like products of vinylidene chloride copolymers.

Other objects, features and advantages of the present invention will be apparent from the following description.

Originally, film-like products manufactured from the above-mentioned compositions of vinylidene chloride copolymer are remarkably less gas permeable and have high water-proofness and resistance against chemicals, and in consequence, have widely been used as various packaging materials. However, since those compositions exhibit such properties, it has heretofore been impossible to produce printing ink capable of furnishing a surface print of high adherence. That is, vinylidene chloride films or film-like products, on which the printing has been effected by using usual commercial printing ink, have various disadvantages, namely, when the prints are left for an extended time in contact with another vinylidene chloride film or film-like product, offset of color will occur, and particularly, in an extreme case, the printed surfaces strip or peel off when subjected to slight friction. In order to prevent from peeling off and off-setting, powders were applied to the printed surfaces to prevent blocking of the surfaces, or the printing was performed between two sheets of films. However, such processes not only render the printing operation to be complicated, but also result in increased costs.

The present invention is intended to overcome the aforementioned disadvantages, and resides in a printing ink for films or film-like products of copolymers of vinylidene chloride, which consist essentially of 80 to 99.5% by weight of a terpolymer obtained by polymerizing a monomer mixture composed of 50 to 80 parts of vinyl chloride, 15 to 45 parts of vinylidene chloride and less than 10 parts of other highly polarized monomers copolymerizable with the said chloride monomers, and 20.0 to 0.5% by weight of a plasticizer, admixed with a solution composed of a solvent or a solvent mixture selected from ketones, esters of fatty acids and aromatics, each having the boiling point of 60 to 120° C., and a pigment. Thus, according to the present invention, prints having the high resistance to abrasion and non-peeling properties on the vinylidene chloride films or film-like products are made possible and ensured.

As is well-known, printing inks consist of a solvent, vehicle such as natural or synthetic resins, pigment and other auxiliary agents. Of such components the most important one is the resin for the vehicle which particularly influences the properties of resulting ink. The necessary properties of the resin for vehicle are as follows:

(1) Such resins should be soluble in the universal solvent.
(2) They should have strong adhesive power to the material to be printed.
(3) The softening temperature should be as high as possible.

According to the present invention, it has, by using a multicomponent polymer as a vehicle, become possible to produce printing inks of the high fastness, which have hitherto been impossible to obtain because an appropriate industrially usable solvent for films or film-like products of vinylidene chloride has not been available, or no sufficient adhesive power has been obtainable despite of easy solubility.

In the present invention, for instance, methyl ethyl ketone, methyl isobutyl ketone, ethyl acetate, propyl acetate, butyl acetate, benzene and toluene, each having a boiling point of 60 to 120° C., alone or in a mixture may be used as solvents. Whenever needed, tetrahydrofuran may be used as an auxiliary solvent. When the boiling point is below 60° C., the rate of volatility of such a solvent will be too high at room temperature to maintain constant concentration of the resulting ink, and moreover, the ink will sometimes solidify on the printing press plate, and consequently, such a solvent can not be used for printing ink. On the contrary, when the boiling point is above 120° C., the drying rate is too low to get the sufficient machinability, and moreover, a decrease in adherence will be brought about because of the solvent remaining behind in the press plate. On the other hand, as alcoholic solvents show almost no swelling power against vinylidene chloride copolymers, such solvents are not appropriate for the use in the printing ink.

The vehicle resin for the printing ink, which is essential to the present invention, should be as follows: Namely, as referred to above, strong and firm adhesive power is necessary between the basic material and ink vehicle, in order to provide the adherent printed surface on the basic polyvinylidene copolymer products. The vehicle resin having most strong adhesive power to the poylvinylidene chloride copolymer is preferably one of the same composition. However, such copolymers as described at the beginning of the specification are generally insoluble in the hitherto used solvents, and as a result, they could not be used as a vehicle for printing ink. The resin, which is used in the present invention, and which has adhesive power and moreover is soluble in a generally available solvent, is a terpolymer obtained by copolymerizing a monomer mixture consisting of 50 to 80 parts of vinyl chloride, 15 to 45 parts of vinylidene chloride and less than 10 parts of other highly polarized monomer copolymerizable with the aforesaid chloride monomers. As other highly polarized monomers used herein, maleic acid anhydride, acrylonitrile and vinylidene cyanamide may be used. Polymers prepared with the said composition are extremely easily soluble in such a solvent as, for instance, methyl ethyl ketone, butyl acetate, toluene or the like, and further have a strong adhesive power to the polyvinylidene copolymer products.

Resins which consist of copolymers comprising vinyl chloride, vinylidene chloride and other highly polarized monomers, departing from the region of the aforementioned composition, may not be used for the vehicle, because the solubility in the solvent is reduced and the adhesive power is lowered. On the other hand, printed surfaces of high fastness can not be obtained with copolymers or multipolymers consisting of other components, for instance, vinyl chloride-vinyl acetate copolymers because of their low adhesive power to the polyvinylidene copolymers.

The above-mentioned printing ink prepared with the solvent, resin and pigment is not yet a perfect ink.

The resin employed for vehicle of this type may be manufactured by emulsion-, solution- or suspension polymerization processes with a good yield.

Generally, so far as polymer compositions, which are to be obtained by melt extrusion, are concerned, it is normal practice to add a lubricant to the resulting composition, and for this reason, the adherence of printing is apt to decrease. In order to avoid such a tendency, 20.0 to 0.5% by weight of generally used plasticizer, for instance, such as ester plasticizer, especially phthalic acid plasticizer, for instance, dioctyl phthalate and butyl phthalyl butyl glycolate, are added to 80 to 99.5% by weight of the resin employed as vehicle.

A special pigment is not required as the pigment to be compounded with the ink, and all pigments generally used for printing inks and causing no bleeding to occur may be used. A printed surface which is remarkably beautiful and has high adherence may be obtained with the inks according to the invention.

This invention is further described in the following examples which are illustrative but not limitative thereof, and in which reference is also made to comparative examples.

*Example 1*

As a solvent, 60 parts of mixed solvent comprising 30% by weight of methyl ethyl ketone, 40% by weight of methyl isobutyl ketone and 30% by weight of toluene; as vehicle resin, 20 parts of terpolymer comprising 57% by weight of vinyl chloride, 38% by weight of vinylidene chloride and 5% by weight of maleic acid anhydride; and as a pigment, 20 parts of rutile type titanium white were mixed together and the resulting mixture was further admixed with dioctyl phthalate in an amount of 10% by weight, based on the weight of the resin. Thereafter, the mixture thus produced was thoroughly mixed with stirring in a hermetically closed vessel to produce printing ink.

By using said printing ink, the printing was performed on a film of 4/100 mm. thickness made from copolymer composition consisting of 90% by weight of vinylidene chloride and 10% by weight of vinyl chloride, in a usual manner. Then the resulting printed surface showed the high resistance to abrasion and non-peeling properties, after hot blast drying being effected for 30 seconds at 80° C. No color-offset was recognized on the printed surface even after folding for 10 hours under a pressure of 0.3 kg./cm.$^2$ at 60° C. In addition, no blocking of films occurred.

*Example 2*

As a solvent, 70 parts of mixed solvent comprising 10% by weight of tetrahydrofuran, 40% by weight of methyl ethyl ketone and 50% by weight of butyl acetate; as a resin, 20 parts of terpolymer comprising 75% by weight of vinyl chloride, 20% by weight of vinylidene chloride and 5% by weight of acrylonitrile; and as a pigment, 10 parts of phthalocyanine blue were mixed together, and the resulting mixture was further admixed with butyl phthalyl butyl glycolate in an amount corresponding to 0.8% by weight of the resin, and printing ink was produced from the mixture by a similar method as in Example 1.

By using this printing ink, a printing was carried out on a film surface formed from a copolymer composition comprising 85% by weight of vinylidene chloride and 15% by weight of vinyl chloride. The printed surface thus obtained showed the high adherence as in Example 1.

*Comparative Example 1*

As a solvent, 60 parts of mixed solvent consisting of 20% by weight of methylethyl ketone, 30% by weight of ethyl acetate and 50% by weight of methyl isobutyl ketone; as a resin, 20 parts of copolymer consisting of 80% by weight of vinyl chloride and 20% by weight of vinyl acetate; and 20 parts of rutile type titanium white were mixed together, and from the resulting mixture, printing ink was produced in the same manner as that of Example 1. By using the resulting printing ink, the printing was performed on a film formed from a copolymer composition consisting of 90% by weight of vinylidene chloride and 10% by weight of vinyl chloride, and when a Scotch tape adhered to the printed surface was taken up, the printed surface was easily peeled off together with the Scotch tape even after sufficient drying, and moreover, the printing ink caused a color-offset to another film surface by a test under a pressure of 0.3 kg./cm.$^2$ for 1 hour at 60° C. Accordingly, the printed surface obtained in the process of this example was of no practical use.

*Comparative Example 2*

As a solvent, 70 parts of mixed solvent comprising 50% by weight of ethyl acetate and 50% by weight of methyl isobutyl ketone; 20 parts of terpolymer consisting of 20% by weight of vinyl chloride, 60% by weight of vinylidene chloride and 20% by weight of acrylonitrile; and as a pigment, 10 parts of benzidin yellow were mixed together, and from the resulting mixture, printing ink was obtained. By using the resulting ink, the printing was performed on a film made from copolymer composition consisting of 75% by weight of vinylidene chloride and 25% by weight of vinyl chloride. The resulting printed surface was easily peeled and caused an offset similarly as in Comparative Example 1, even though the printed surface was thoroughly dried. Furthermore, when filled with fish sausage and sterilized in hot water for 1 hour at 80° C., the printing ink was stripped to pieces and was of no practical use.

What is claimed is:

1. A printing ink for vinylidene chloride copolymer products capable of providing prints having high adherence to the polyvinylidene copolymer products, which consists essentially of 80 to 99.5% by weight of terpolymer obtained by polymerizing a monomer mixture comprising 50 to 80 parts by weight of vinyl chloride, 15 to 45 parts by weight of vinylidene chloride and another highly polarized monomer copolymerizable with said chloride monomers selected from the group consisting of maleic acid anhydride, acrylonitrile and vinylidene cyanamide in an amount effective to increase adherence of the prints to the polyvinylidene copolymer products which is less than 10%, and 20.0 to 0.5% by weight of plasticizer, admixed with a solution comprising at least one solvent selected from the group consisting of ketones aliphatic acid esters and aromatic compounds which have respectively a boiling point of 60 to 120° C. and are capable of dissolving the above-mentioned terpolymer, and a pigment.

2. A printing ink is claimed in claim 1, wherein the plasticizer if a phthalic acid ester.

3. A printing ink as claimed in clam 1, wherein the solvent selected from ketones, aliphatic acid esters and aromatic compounds, which are respectively capable of dissolving the terpolymer and have a boiling point of 60 to 120° C., is at least one member selected from the group consisting of methyl ethyl ketone, methyl isobutyl ketone, ethyl acetate, propyl acetate, butyl acetate, benzene and toluene.

4. A printing ink as claimed in claim 1, wherein the solvent selected from ketones, aliphatic acid esters and aromatic compounds, which have respectively a boiling point of 60 to 120° C. and are capable of dissolving the terpolymer, is a mixed solvent of at least one member selected from the group consisting of methyl ethyl ketone, methyl isobutyl ketone, ethyl acetate, propyl acetate, butyl acetate, benzene and toluene, with tetrahydrofuran.

5. A printing ink as claimed in claim 1, wherein the plasticizer is a phthalic acid ester, and the solvent selected from ketones, aliphatic acid esters and aromatic compounds, which have respectively a boiling point of 60 to 120° C. and are capable of dissolving the terpolymer, is at least one member selected from the group consisting of methyl ethyl ketone, methyl isobutyl ketone, ethyl acetate, propyl acetate, butyl acetate, benzene and toluene.

References Cited by the Examiner

UNITED STATES PATENTS 2,328,748 9/1943 Scott et al.
2,990,391 6/1961 Grantham _____ 260—30.6
3,136,657 6/1964 Dixler et al.

MORRIS LIEBMAN, *Primary Examiner.*

L. T. JACOBS, *Assistant Examiner.*